Patented Oct. 10, 1933

1,929,544

UNITED STATES PATENT OFFICE 1,929,544

RUBBER COMPOUND AND METHOD OF MAKING THE SAME

Frank O. Woodruff, Quincy, Mass., assignor to Harry H. Beckwith, Brookline, Mass.

No Drawing. Application April 9, 1930
Serial No. 442,998

14 Claims. (Cl. 106—23)

This application is a continuation in part of my copending application Serial No. 198,009, filed June 10, 1927. The invention relates to a rubber product and a method of making the same.

An object of the invention is to provide a partial substitute for dispersed rubber in the production of rubber coagulum to be used in manufacturing rubber articles of all kinds, the substitute substance or substances being such as to yield a coagulum closely resembling in every way pure coagulated rubber and comparing favorably in tensile strength with pure rubber. In other words, the chief object of the invention is to use substitute materials with an aqueous dispersion of rubber such as latex so as to materially increase the quantity of coagulated product obtained from a given amount of rubber without appreciably altering the physical characteristics of the product.

Latex is a term applied to certain juices extracted from a considerable number of different trees, these juices in this case being capable of yielding some kind of rubber. Of these trees, the one of principal importance is Hevea braziliensis, this yielding a latex from which the well known Pará rubber is derived. Latex from this tree consists of a natural colloidal dispersion of rubber globules in a watery vehicle, and contains about 34 to 39 percent of solids depending on conditions such as seasons, age of tree, etc. The rubber globules are believed to consist of a core of terpene, represented by the chemical symbol $(C_5H_8)_n$ surrounded by a coating of proteid matter. The watery vehicle in which the rubber particles are suspended also contains proteids which apparently keep the rubber globules separate. These proteids are subject to decomposition and putrefaction, so that if it is desired to transport latex or to keep it for more than a day or two, it is necessary to add a preservative, such as a small quantity of ammonia or formalin.

In preparing rubber for industrial uses, the globules of rubber may be coagulated in the latex by any of a number of methods which are supposed to break down or destroy the agencies in latex which tend to keep the globules separate. It is an object of the present invention to increase the yield from an aqueous dispersion of rubber such as latex by mixing with the dispersion other substances which will react chemically to form a suitable diluent or filler for the rubber, the reaction being preferably of a nature to result in the simultaneous coagulation of the rubber and diluent substances in a homogeneous mass, the physical characteristics of which closely resemble those of pure coagulated rubber.

In carrying out my invention, I preferably add to latex (taken directly from the tree or preserved with ammonia) a quantity of one or more diluent materials such as oils, gums, resins or other colloids. The product obtained from properly coagulated mixtures of rubber and suitable diluents varies with the kind and quantities of the diluents used. While there are many different substances which are capable of being combined with rubber molecules so as to form a rubbery, non-sticky coagulum, it is preferable to employ diluent substances which are not themselves subject to deterioration with age. Thus, according to the present invention, I preferably employ water soluble gums and mineral oils, neither of these classes of substances being subject to deterioration by becoming rancid or by fermentation. Where the ultimate rubber products are intended for use over an extended period of time, the chemical stability of the diluent materials is of considerable importance.

In forming a coagulum in which dispersed rubber has been combined with a diluent substance so as to substantially increase the quantity of coagulum obtained from a given amount of rubber without materially changing its physical characteristics, the ingredients must be brought together in a certain manner in order to obtain a non-sticky, cohesive, rubbery coagulum, especially if a product is desired having relatively great tensile strength after vulcanization. In bringing together the rubber particles and the diluent particles to unite in a rubber coagulum, I prefer to mix thoroughly a quantity of latex or other aqueous dispersion of rubber with an approximately equal quantity of a solution or emulsion of diluent materials. It is advantageous to prepare the diluent materials in such a manner as to produce the smallest particle size conveniently obtainable. This makes possible a more intimate intermixture of the rubber particles and the diluent particles with each other, thus increasing the uniformity as well as the strength of the ultimate product. After the dispersed rubber and diluent substances have been thoroughly mixed, I preferably precipitate a combined coagulum by stirring into the mixture a small quantity of an aldehyde, such as formaldehyde, acetaldehyde, benzaldehyde or furfural. The effect of the addition of the aldehyde, with gentle warming of the mixture, is to bring about an agglomeration of the rubber and diluent substances in the form of an elastic, non-sticky, rubbery coagulum which behaves like a coagulum of pure rubber. If properly made, this coagulum may be washed, dried, milled and vulcanized in precisely the same manner as a coagulum of pure rubber, the tensile strength of the ultimate product being of the same order as that of pure vulcanized rubber.

As an example of a specific application of my method, I take fifty parts of rubber in an aqueous dispersion, such as latex, thirty to forty parts of a water soluble gum, such as gum arabic, and twenty to ten parts of a suitable oil, preferably a mineral oil which is not subject to deterioration with age. For this purpose a refined petroleum oil is satisfactory. The gum may be dissolved in three times its weight of water. The oil is preferably emulsified as by mixing with the gum solution and circulating the mixture through a colloid mill so that the particles become very finely divided and a stable emulsion is formed, the gum acting as an emulsifying agent. The emulsion is then mixed with the rubber dispersion by careful stirring. To this mixture I may add a small quantity of an aldehyde, formaldehyde being effective and convenient. The formaldehyde solution is preferably added slowly and stirred into the mixture. The mixture may also be slightly warmed during the addition of the formaldehyde. If a forty per cent solution of formaldehyde is used, the quantity of solution of this strength sufficient to bring about a successful coagulation of the solids in the mixture will be approximately two per cent of the total weight of solids in the mixture. After the coagulation is complete, a clear watery serum separates therefrom. This serum is entirely free from particles of rubber or gum, and is also free from any trace of oil. If the serum is passed through a filter paper, no residue is left thereon.

Prior to mixing the ingredients together, vulcanizing reagents may be conveniently added thereto so that after coagulation, the coagulum has distributed therein suitable quantities of vulcanizing reagents. For example, in carrying out the process as hereinbefore described in detail with 50 parts rubber in dispersed form, 30 to 40 parts gum arabic, and 20 to 10 parts mineral oil, the gum solution may be conveniently divided into two portions. To one of the portions 3 parts of finely divided sulphur is added and mixed in. Then ammonia is added to the mixture. Into the other portion of gum solution 5 parts of zinc oxide may be mixed. The two portions may then be mixed together with the oil, and the whole mixture passed twice through a colloid mill. This reduces the maximum particle size for all the ingredients in the mixture to about one-half micron. The mixture is then taken from the colloid mill and cooled, a small amount of ammonia being preferably added. After cooling, the mixture is stirred carefully into latex or other dispersion of rubber whereupon an aldehyde is gradually added, preferably with gentle warming, until coagulation takes place. The coagulum is washed and dried, then milled for a few minutes with ¼% of a suitable accelerator, after which it can be vulcanized in the usual manner. This formula yields rubber products which are characterized by particularly high tensile strength and long life. By following the formula, vulcanized samples have been made having a tested tensile strength exceeding 3400 lbs. per square inch. This compares favorably with the strength of the best pure rubbers which have been similarly vulcanized and tested. It is obvious that the specific proportions of ingredients given herein by way of example may be varied, and other equivalent ingredients may be employed instead of or in addition to those mentioned without departing from the scope of the invention.

I claim:

1. A method of preparing a rubber coagulum, which comprises mixing with a quantity of dispersed rubber a quantity of diluent material capable of forming a rubbery coagulum with the rubber and including mineral oil in the form of a stable emulsion and an emulsifying agent therein, and thereafter adding a small quantity of an aldehyde to resolve the mixture into a non-sticky, resilient, rubbery coagulum containing all the rubber and diluent present and a clear watery serum.

2. A method of preparing a rubber coagulum, which comprises mixing with a quantity of dispersed rubber a quantity of diluent material capable of forming a rubbery coagulum with the rubber and including an aqueous emulsion of mineral oil and a water-soluble gum therein as emulsifying agent, and thereafter adding a small quantity of an aldehyde to resolve the mixture into a non-sticky, resilient, rubbery coagulum containing all the rubber and diluent present and a clear watery serum.

3. A method of making a rubber product, which comprises dissolving 30 to 40 parts by weight of gum arabic in about three times as much water, adding to a portion of the gum solution 3 parts of finely divided sulphur and a small quantity of ammonia, adding to the other portion of gum solution 5 parts of zinc oxide, mixing together the portions of gum solution with 20 to 10 parts of oil to make 50 parts of gum and oil, emulsifying the oil in the gum solution, mixing the emulsion with latex containing 50 parts of rubber, coagulating the solids in the mixture by gradually stirring in a small quantity of an aldehyde and warming, washing and drying the resulting coagulum, milling into the coagulum ¼% of an accelerator, and vulcanizing the milled mass.

4. A method of preparing a rubber coagulum which comprises making a stable emulsion of mineral oil with a water-soluble gum as emulsifying agent, adding to the emulsion a dispersion of rubber containing an amount of rubber substantially equal to the quantity of oil and solids in the emulsion, and coagulating the mixture by stirring in a small quantity of an aldehyde with gentle warming.

5. A method of preparing a rubber coagulum, which comprises dissolving a quantity of water-soluble gum, mixing the dissolved gum with a lesser quantity of mineral oil, passing the mixture through a colloid mill whereby the particles of gum and oil are finely divided and a stable emulsion is formed, adding the mixture to a quantity of latex containing a weight of rubber equal to the combined weights of the gum and oil in the mixture, stirring into the mixture a small quantity of formaldehyde and warming the mixture during the addition of the formaldehyde until coagulation takes place.

6. A method of making a non-sticky, resilient, rubbery coagulum, which comprises emulsifying an oil with a sufficient quantity of an emulsifying agent to form a stable emulsion, mixing with the emulsion a quantity of dispersed rubber not less in weight than the combined weights of the oil and emulsifying agent, and coagulating the mixture by stirring in a small quantity of an aldehyde.

7. A method of making a non-sticky, resilient, rubbery coagulum, which comprises emulsifying an oil with a sufficient quantity of an emulsifying agent to form a stable emulsion, mixing with the emulsion a quantity of dispersed rubber not less in weight than the combined weights of the oil and emulsifying agent, and coagulating the mixture by stirring in a quantity of 40% solution of formaldehyde equal in weight to about 2% of the oil and solids in the mixture.

8. A method of making a non-sticky, resilient, rubbery coagulum, which comprises making a stable emulsion of an oil with a water-soluble gum as emulsifying agent, adding to the emulsion a quantity of rubber in dispersed form not less in weight than the combined weights of the oil and gum, and coagulating the mixture by stirring in a small quantity of an aldehyde with gentle warming.

9. A method of making a non-sticky, resilient, rubbery coagulum, which comprises making a stable emulsion of an oil with a water-soluble gum as emulsifying agent, adding to the emulsion a quantity of rubber in dispersed form not less in weight than the combined weights of the oil and gum, and coagulating the mixture by stirring in a quantity of 40% solution of formaldehyde equal in weight to about 2% of the oil and solids in the mixture.

10. A non-sticky, resilient, rubbery coagulum having the physical characteristics of a pure rubber coagulum, coagulated from a mixture of rubber in dispersed form and a substantial proportion of an oil in a stable emulsion with an emulsifying agent.

11. A non-sticky, resilient, rubbery coagulum having the physical characteristics of a pure rubber coagulum, coagulated from a mixture of rubber in dispersed form and a substantial proportion of an oil in a stable emulsion with a water-soluble gum as emulsifying agent.

12. A non-sticky, resilient, rubbery coagulum having the physical characteristics of a pure rubber coagulum, coagulated from a mixture of rubber in dispersed form and a substantial proportion of a mineral oil in a stable emulsion with an emulsifying agent.

13. A non-sticky, resilient, rubbery coagulum having the physical characteristics of a pure rubber coagulum, coagulated from a mixture of rubber in dispersed form and a substantial proportion of a mineral oil in a stable emulsion with a water-soluble gum as emulsifying agent.

14. A non-sticky, resilient, rubbery coagulum having the physical characteristics of a pure rubber coagulum, coagulated from a mixture of fifty parts by weight of rubber in dispersed form and ten to twenty parts of mineral oil in a stable emulsion with forty to thirty parts of a water-soluble gum as emulsifying agent.

FRANK O. WOODRUFF.